United States Patent
Charles et al.

(10) Patent No.: US 8,850,800 B2
(45) Date of Patent: *Oct. 7, 2014

(54) RADIAL MOUNTING FOR REGENERATION DEVICE

(71) Applicants: Eric J. Charles, Peoria, IL (US); Jack A. Merchant, Peoria, IL (US); David L. Demeny, Delavan, IL (US); Govind S. Madaiah, Dunlap, IL (US); Naseer A. Niaz, Cambridgeshire (GB); Eric J. Blankenship, Washington, IL (US); Thomas R. McClure, Washington, IL (US)

(72) Inventors: Eric J. Charles, Peoria, IL (US); Jack A. Merchant, Peoria, IL (US); David L. Demeny, Delavan, IL (US); Govind S. Madaiah, Dunlap, IL (US); Naseer A. Niaz, Cambridgeshire (GB); Eric J. Blankenship, Washington, IL (US); Thomas R. McClure, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 31 days.

This patent is subject to a terminal disclaimer.

(21) Appl. No.: 13/653,620

(22) Filed: Oct. 17, 2012

(65) Prior Publication Data
US 2013/0047590 A1    Feb. 28, 2013

Related U.S. Application Data

(63) Continuation of application No. 12/644,595, filed on Dec. 22, 2009, now Pat. No. 8,429,903.

(51) Int. Cl.
*F01N 3/00* (2006.01)
*F01N 13/18* (2010.01)
*F01N 3/20* (2006.01)
*F01N 3/025* (2006.01)
*F01N 13/02* (2010.01)

(52) U.S. Cl.
CPC .......... *F01N 3/0256* (2013.01); *F01N 13/1855* (2013.01); *F01N 3/2033* (2013.01); *F01N 13/1805* (2013.01); *F01N 2610/03* (2013.01); *F01N 13/02* (2013.01); *Y02T 10/26* (2013.01); *F01N 2230/02* (2013.01)
USPC .................... 60/295; 60/274; 60/286; 60/303; 137/15.17; 137/15.18; 137/507

(58) Field of Classification Search
USPC ........... 60/272, 274, 286, 295, 297, 301, 303, 60/311; 137/15.17, 15.18, 507
See application file for complete search history.

(56) References Cited

U.S. PATENT DOCUMENTS

| 537,771 A | 4/1895 | Hirsh |
| 987,332 A | 3/1911 | Ten Eyok |

(Continued)

*Primary Examiner* — Binh Q Tran
(74) *Attorney, Agent, or Firm* — Miller, Matthias & Hull

(57) ABSTRACT

An exhaust treatment system for machine is disclosed that includes a burner body having an inlet for receiving a flow of exhaust, an outlet for the exhaust flow to exit, an opening and a receiving mount disposed around the opening. A fuel injector head is mounted over the opening in any one of a plurality of angular positions relative to the body. The burner body includes a plurality of mounting pads extending at least partially and circumferentially around the burner body for coupling a support bracket to the burner body in any one of a plurality of positions relative to the burner body. The support bracket may be used to couple the burner to a fixture device such as a cradle for supporting other exhaust treatment system components.

19 Claims, 4 Drawing Sheets

(56) References Cited

U.S. PATENT DOCUMENTS

| | | | |
|---|---|---|---|
| 4,987,738 A | 1/1991 | Lopez-Crevillen et al. | |
| 5,170,752 A | 12/1992 | Binversie et al. | |
| 5,339,630 A | 8/1994 | Pettit | |
| 5,571,484 A * | 11/1996 | Pettit et al. | 422/173 |
| 5,893,589 A | 4/1999 | Bleitz et al. | |
| 6,192,677 B1 * | 2/2001 | Tost | 60/286 |
| 6,279,603 B1 * | 8/2001 | Czarnik et al. | 137/339 |
| 7,156,614 B2 | 1/2007 | Racer et al. | |
| 7,406,822 B2 | 8/2008 | Funke et al. | |
| 7,467,749 B2 * | 12/2008 | Tarabulski et al. | 239/5 |
| 7,481,048 B2 | 1/2009 | Harmon et al. | |
| 7,523,606 B2 | 4/2009 | Strauser et al. | |
| 7,603,849 B2 * | 10/2009 | Hanitzsch et al. | 60/286 |
| 8,024,922 B2 * | 9/2011 | van Vuuren et al. | 60/286 |
| 8,087,239 B2 * | 1/2012 | Bugos et al. | 60/298 |
| 8,429,903 B2 * | 4/2013 | Charles et al. | 60/295 |
| 2006/0101810 A1 * | 5/2006 | Angelo et al. | 60/286 |
| 2007/0000241 A1 | 1/2007 | Funke et al. | |
| 2007/0044453 A1 | 3/2007 | Strauser et al. | |
| 2007/0199312 A1 | 8/2007 | Kapparos et al. | |
| 2008/0078172 A1 | 4/2008 | Miller et al. | |
| 2008/0155969 A1 | 7/2008 | DaCosta et al. | |
| 2008/0208431 A1 | 8/2008 | Abraham et al. | |
| 2008/0209895 A1 | 9/2008 | Miller et al. | |
| 2008/0295486 A1 | 12/2008 | Crowell et al. | |
| 2009/0138185 A1 | 5/2009 | Klein et al. | |

* cited by examiner

RADIAL MOUNTING FOR REGENERATION DEVICE

RELATED APPLICATION DATA

The present application is a continuation of U.S. patent application Ser. No. 12/644,595 filed Dec. 22, 2009, and entitled, "Radial Mounting for Regeneration Device," which is hereby incorporated by reference herein in its entirety.

TECHNICAL FIELD

This disclosure relates generally to heating systems for exhaust treatment devices such as particulate filters including, but not limited to diesel particulate filters (DPFs) and methods of retrofitting existing equipment with the disclosed heating systems. More specifically, this disclosure relates to flexible mounting schemes for coupling a burner and fuel injector head to a DPF, other type of filter or other type of emission control device that can be regenerated or activated with heat and that enables the disclosed burner and head to be mounted easily to many differently-configured exhaust treatment systems.

BACKGROUND

Engines, including diesel engines, gasoline engines, natural gas engines, and other known engines exhaust a complex mixture of air pollutants. The air pollutants may be composed of both gaseous and solid material, such as particulate matter. Particulate matter may include ash and unburned carbon particles called soot.

Due to increased environmental concerns, engine manufacturers have developed systems to treat engine exhaust after it leaves the engine. Some of these systems employ exhaust treatment devices such as particulate traps or filters to remove particulate matter from the exhaust flow. For diesel engines, the filter is often referred to as the DPF (diesel particulate filter). After an extended period of use, however, the filter material of the DPF may become partially saturated with particulate matter, thereby hindering the ability of the filter material to capture additional particulates and also hindering flow through the DPF.

However, the collected particulate matter in a DPF may be removed through a process called regeneration (i.e., regeneration of the filter). Specifically, a DPF may be regenerated by heating the filter material and the trapped particulate matter above the combustion temperature of the particulate matter, thereby combusting the accumulated particulate matter. The temperature of the exhaust flowing through a DPF may be raised using a flame producing burner specially configured for the particular equipment. One such system is disclosed in commonly assigned US2008/0078172.

SUMMARY OF THE DISCLOSURE

An exhaust treatment system is disclosed that includes a body including an inlet for receiving a flow of exhaust, an outlet for the exhaust flow to exit, an opening and a receiving mount disposed around the opening. The exhaust treatment system also includes an injector head including a head mount that engages the receiving mount of the body to mount the injector head over the opening of the body in one of a plurality of angular positions relative to the body. The body is coupled to or includes a plurality of mounting pads that extend at least partially and circumferentially around the body for coupling a support bracket to the body in one of a plurality of angular positions relative to the body.

A method of modifying an exhaust treatment system of a machine having an engine is also disclosed. The method includes orienting an injector head relative to a burner body in one of a plurality of positions and coupling the injector head to an opening in the burner body. The burner body includes an exhaust gas inlet and an exhaust gas outlet. The burner body also includes a plurality of pads extending at least partially around an outer surface the burner body. The method further includes securing a support bracket to one of the plurality of pads on the burner body in one of the plurality of angular positions with respect to the burner body. The method further includes coupling the exhaust gas inlet of the burner body to an exhaust conduit in communication with the engine and coupling the exhaust gas outlet of the burner body to an after-treatment device of the exhaust treatment system that can be regenerated by heat created in the burner body. The method also includes coupling the support bracket to the machine.

A machine is also disclosed that includes an engine connected to an exhaust treatment system. The exhaust treatment system includes a burner including a burner body including an inlet for receiving a flow of exhaust, an outlet connected to a particulate filter, an opening and a receiving mount disposed around the opening. The burner further includes an injector head including a head mount coupled to the receiving mount over the opening in one of a plurality of positions relative to the burner body. The burner body is coupled a plurality of mounting pads extending at least partially and circumferentially around the body for coupling a support bracket to the burner body in one of a plurality of angular positions relative to the body. The support bracket couples the burner body directly or indirectly to the machine.

DETAILED DESCRIPTION

Existing burner assemblies for exhaust systems are not configured for versatility; most burners are not useable with different engines and/or different exhaust systems of different sizes, shapes and configurations. Moreover, existing burner assemblies are often too large to be installed as part of an engine package. As a result, it may be difficult to accurately calibrate the burner and the engine system together as a working unit.

This disclosure is directed toward overcoming one or more of the flexibility and size constraints set forth above. While the examples of this disclosure are directed primarily to diesel engines and DPFs, one skilled in the art will appreciate that this disclosure is clearly applicable to other fossil fuel burning engines that employ filters that both trap particulates and that are robust enough for heat-based regeneration. Further, one skilled in the art will also appreciate that the disclosed burner assemblies are also applicable to other emission-control devices that can be activated with heat, such as certain catalyst systems.

Figure 1:
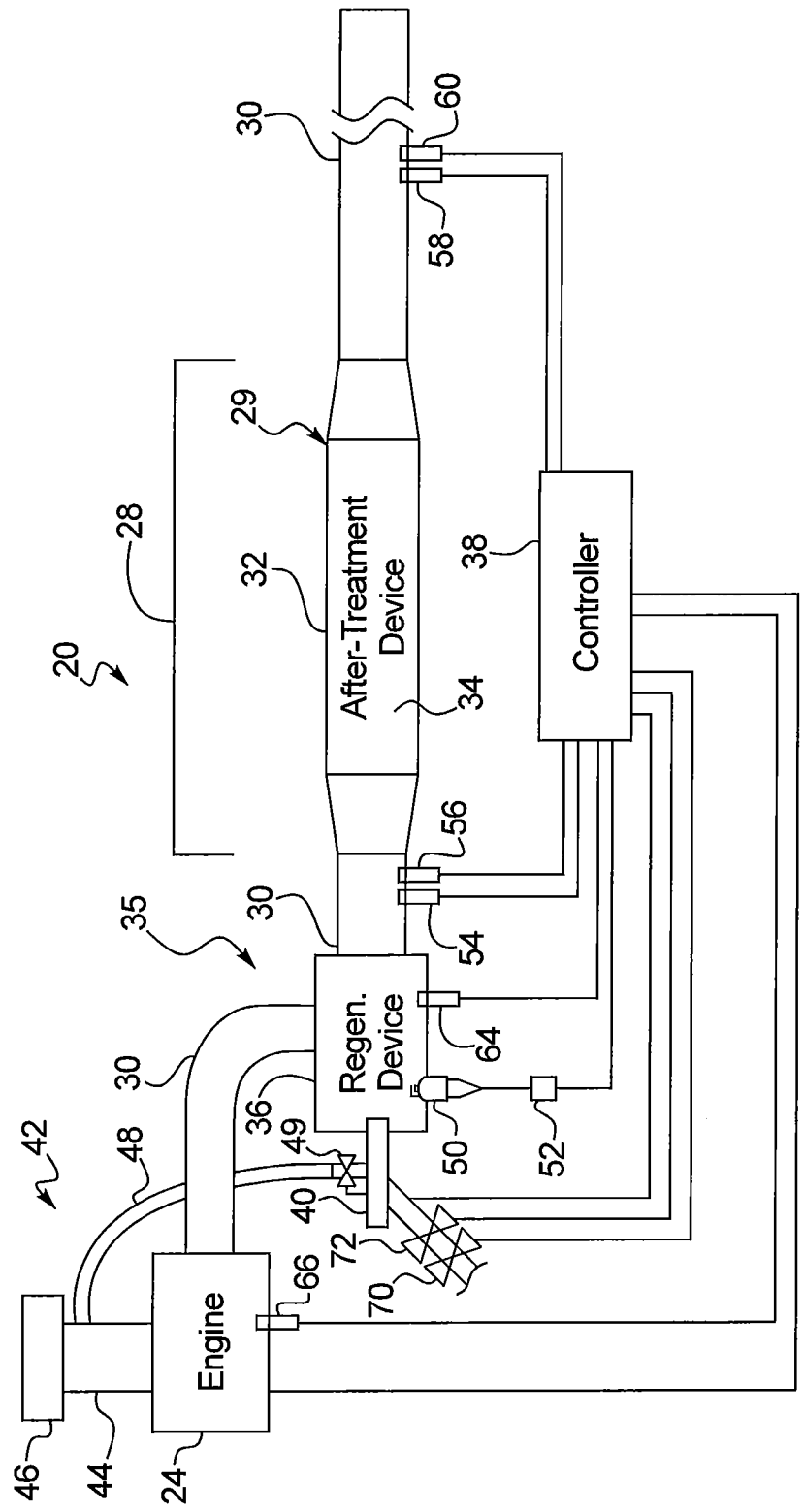
FIG. 1 is a diagrammatic illustration of an exhaust treatment system, burner assembly and after-treatment device, which may be a DPF.

FIG. 1 illustrates an exhaust treatment system 20 for an engine 24. The engine 24 may be an internal combustion engine, such as a gasoline engine, a diesel engine, a natural gas engine or any other exhaust gas producing engine. The engine 24 may provide power to a moving vehicle or be part of a stationary power generator, pump system, etc. The exhaust treatment system 20 may include a plurality of after-treatment devices 28 that may be periodically regenerated or activated with heat from the one or more burner assemblies 35.

The one or more burner assemblies 35 may be disposed upstream of one or more after-treatment devices 28. In one embodiment, the after-treatment device 28 may include a particulate filter 29, such as a DPF. The particulate filter 29 may be configured to remove one or more types of particulate matter from the exhaust gases produced by engine 24 and flowing through an exhaust conduit 30 from the engine 24 to the after-treatment device(s) 28. The particulate filter 29 may include an outer housing 32, which may encase a filter material 34 for trapping particulate matter. The filter material 34 should to be robust enough to withstand a heat-based regeneration.

Although the after-treatment device 28 is discussed herein includes a particulate trap or filter 29 such as a DPF, in other embodiments, after-treatment device 28 may include a selective catalytic reduction device (SCR), catalytic converter, catalytic particulate trap, NOx adsorber, or any other after-treatment device that may be activated with heat or that may operate under conditions hot enough for the periodic regeneration of the filter 29. Alternatively or additionally, the after-treatment devices 28 may include combinations of these devices. For example, after-treatment device 28 may include a particulate filter 29 and an SCR in series, which, in some embodiments, may be integrated into the same unit (e.g., in the same housing 32).

To regenerate the filter 29 with heat, the exhaust treatment system 20 may include a burner assembly 35 configured heat the exhaust stream upstream from the filter 29. For example, the burner assembly 35 may include a burner 36 configured to increase the temperature of the exhaust gases flowing through exhaust conduit 30 upstream from the filter 29 and the after-treatment device(s) 28. Accumulation of solid exhaust flow constituents the filter 29 and/or other components of the after-treatment device 28 may result in a decline in engine performance and/or possible damage to after-treatment device 28 and/or other components of exhaust treatment system 20. The burner 36 may be configured to cause at least some of the particulate matter that may have accumulated in the filter 29 and other components of the after-treatment device 28 to be combusted or burned off.

Although the exhaust treatment system 20 is shown with a single after-treatment device 28, a single filter 29 and a single burner assembly 35, the exhaust treatment system 20 may include more than one after-treatment device 28, more than one filter 29 and/or more than one burner assembly 35. For example, in one embodiment, the exhaust treatment system 20 may include a single burner assembly 35 configured to regenerate or activate a plurality of after-treatment devices 28. In another embodiment, the exhaust treatment system 20 may include two burner assemblies 35 configured to regenerate or activate from one or more after-treatment devices 28.

For purposes of the following explanation, the after-treatment device 28 of the exhaust treatment system 20 will be discussed as including a filter, particulate trap or DPF 29, while the burner assembly 35 will be discussed as including a burner 36 and fuel injector head 40. The exhaust treatment system 20 may also include a controller 38 configured to receive information from various sources and to control one or more components of exhaust treatment system 20 based on the sensed information.

The burner assembly 36 may be positioned anywhere along the exhaust conduit 30 between the engine 24 and the DPF 29. The burner assembly 35 may include a fuel injector with a head 40, spark plug 50, igniter coil 52, flame sensor or thermocouple 64, all of which is shown schematically in FIG. 1. Although the burner 36/fuel injector head 40 has been shown and described as including the spark plug 50, alternative ignition sources may be employed, such as, for example, glow plugs or any other means for igniting an air/fuel mixture.

To the supply the fuel injector head 40 with fresh air for mixing with the fuel for combustion, as well as for flushing fuel injector head 40 of any fuel or debris before and/or after operation of burner 36, an air intake system 42 associated with the engine 24 is provided. Air may be routed from a portion of air intake system 42, such as an intake manifold 44, downstream from a compressor 46 configured to create forced induction for the engine 24. The compressor 46 may include a turbocharger, supercharger, or any other device configured to compress intake air and thereby produce forced induction for engine 24. Additional air may be directed from intake manifold 44 to the fuel injector head 40 via an air conduit 48. The supply of air to the burner fuel injector head 40 may be regulated by an air valve 49, which is controllable by controller 38.

The controller 38 may be configured to activate the burner assembly 35 in response to a trigger condition. That is, the controller 38 may monitor for various trigger conditions, and if any of them are met, then the controller 38 may activate the burner assembly 35. The trigger conditions may include, for example, operation of engine 24 for a predetermined amount of time; consumption of a predetermined amount of fuel by the engine 24; detection of an elevated backpressure upstream of the DPF 29 above a predetermined pressure; detection of a pressure differential across the DPF 29 of greater than a predetermined amount; and determination that a calculated amount of particulate matter has accumulated in the DPF 29 is above a predetermined amount.

Regeneration of the DPF 29 may also be initiated manually by an operator, owner, service technician, etc. The exhaust treatment system 20 may include various sensors configured to generate information about operating parameters of the exhaust treatment system 20. For example, the exhaust treatment system 20 may include an upstream temperature sensor 54, an upstream pressure sensor 56, a downstream temperature sensor 58, and a downstream pressure sensor 60. Such sensors may be positioned along exhaust conduit 30 upstream and downstream from the DPF 29 respectively and configured to take measurements of the temperature and pressure of the exhaust gases within exhaust conduit 30 at their respective locations. Such measurements may be received by the controller 38. In addition to fuel on/off valve 70, the exhaust treatment system 20 may also include a fuel pressure regulator valve 72 controllable by controller 38 to regulate the pressure of the fuel, and thereby the rate at which fuel is delivered to the fuel injector head 40.

The exhaust treatment system 20 may also be configured to monitor the stability of the regeneration process by determining a difference between the upstream exhaust temperature measured by upstream temperature sensor 54 and the downstream exhaust temperature measured by the downstream temperature sensor 58. If the temperature measured by the downstream temperature sensor 58 exceeds that measured by the upstream temperature sensor 54 by more than a predetermined amount for more than a predetermined amount of time, the controller 38 may initiate steps to scale back or terminate the regeneration process. For example, in such a case, the controller 38 may reduce the intensity of the flame produced by burner 36. In some circumstances, the controller 38 may terminate the regeneration process if the regeneration process is significantly unstable (e.g., if the downstream exhaust temperature exceeds a predetermined value or it exceeds the upstream exhaust temperature by more than a predetermined amount).

Figure 2:
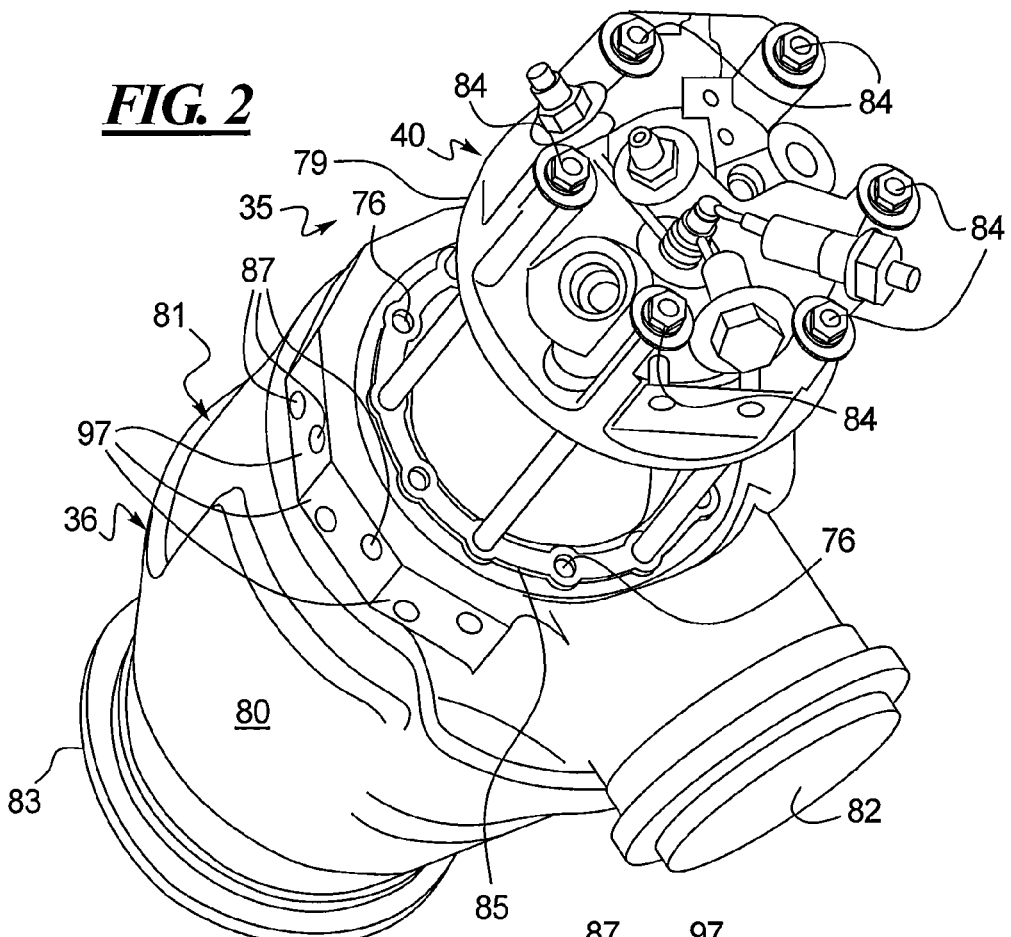
FIG. 2 is a bottom left perspective view of a disclosed burner and fuel injector head of a disclosed burner assembly with the fuel injector head removed.
Figure 3:
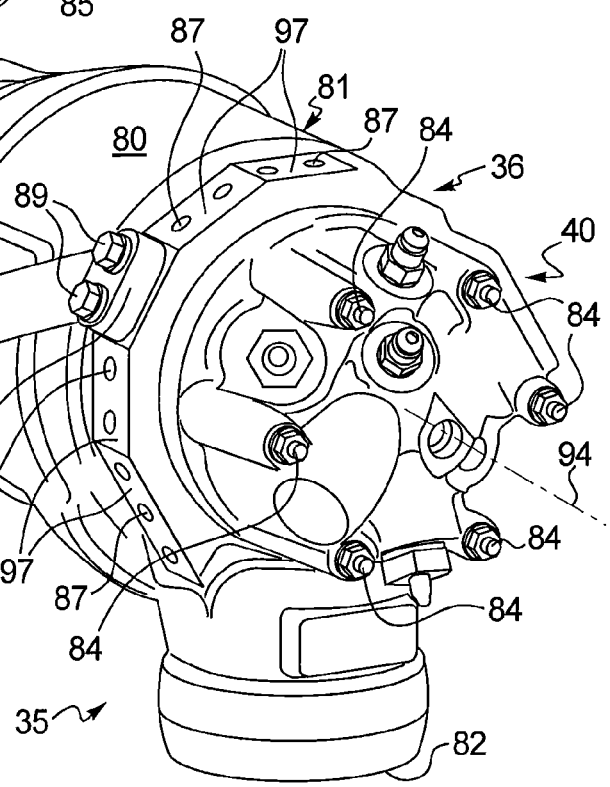
FIG. 3 is a left perspective view of the disclosed burner assembly of FIG. 2 with the fuel injector head connected to the burner.
Figure 4:
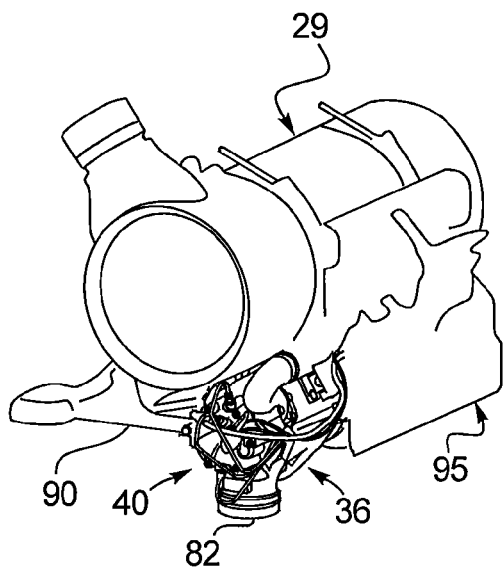
FIG. 4 is right front perspective view of the disclosed burner assembly of FIGS. 2-3, coupled to a cradle and a DPF.

Turning to FIGS. 2-3, the burner 36 includes an burner body 81 with an exhaust gas inlet 82 and an exhaust gas outlet 83. The burner body 81 is also connected to the fuel injector head 40 by a plurality of fasteners 84 distributed circumferentially about the fuel injector head 40 and that pass through a head mount 79 (FIG. 2). Corresponding threaded openings 76 are disposed in the receiving mount 85 of the burner body 81 which enables the head mount 79 of the fuel injector head 40 to be mounted on the receiving mount 85 of the burner body 81 of the burner 36 in a variety of different angular positions.

In addition to the annular receiving mount 85 that couples the burner body 81 to the fuel injector head 40, the burner body 81 may include an additional circumferential mounts or pads 97 on its outer surface 80 for coupling the burner body 81 to the bracket 88 at select angular positions. The circumferentially spaced pads 97 each may include one or more threaded openings 87 for coupling the proximal end 91 of the bracket 88 to one of the pads 97 on the burner body 81 in one of a variety of circumferential positions along the partial ring of pads 97 and therefore different angular positions with respect to a central axis 94 of the burner 36. The pads 97 and threaded openings 87 may form part of the burner body 81 or the partial ring of pads 97 and threaded openings 87 may be coupled to the burner body 81 by welding or other forms of attachment.

The bracket 88, by way of its fasteners 89 can be mounted to the one of the pads 97 and to the burner body 81 of the burner 36 at varying angular positions as shown in FIGS. 4-8. In the embodiment shown in FIGS. 2-8, seven pads 97 are provided which enable rotation of the burner body 81 up to about 180° with respect to the bracket 88 as illustrated by the arc 98 in FIG. 8. As a result, the burner assembly 35 and cradle 90 combination of FIG. 8 may be retrofitted for use with exhaust systems of many different manufacturers and of various types of equipment.

Referring to FIGS. 4-7, the burner 36 can be rotated for purposes of coupling the exhaust inlet 82 to an exhaust line. To maintain the angular position of the fuel injector head 40 and related injector components 95 while the burner 36 is rotated, the fasteners 84 (FIGS. 2-3) are loosened, the bracket 88 is disconnected and the position of the fuel injector head 40 may be held by hand or other clamp device as the burner 36 and burner body 81 are rotated from the position shown in FIGS. 4-5 to the position shown in FIGS. 6-7 before re-coupling the bracket 88 to the burner body 81 at the desired orientation and/or re-coupling the bracket 88 to the cradle 90 or other supporting device with the fasteners 89, 96 (FIG. 3). As the fuel injector head 40 is connected to additional components shown collectively at 95 in FIGS. 4 and 6 that may include fuel input lines, coolant input and output lines, a lead for the thermocouple or flame sensor, spark plug to igniter lead, air inlet line, etc., avoiding any rotation of the fuel injector head 40 may helpful.

Figure 9:
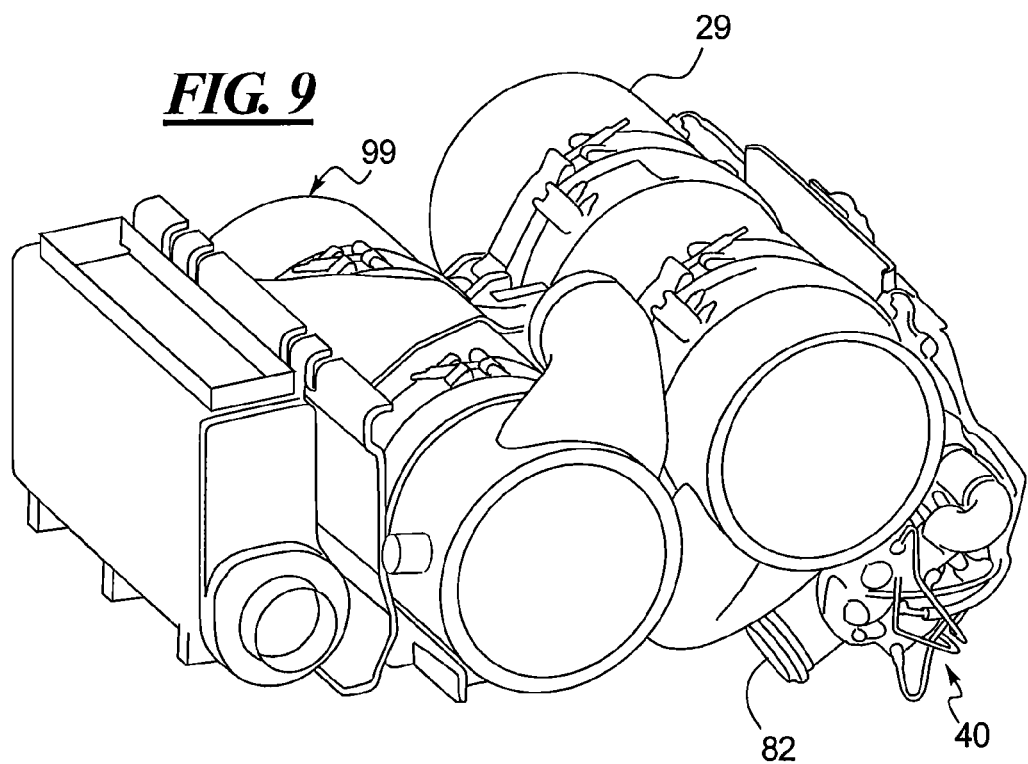
FIG. 9 illustrates the connection of the disclosed burner assembly to a cradle which supports a DPF module and another after-treatment module.

FIG. 9 illustrates the connection of the disclosed burner 36 and fuel injector head 40 to a DPF 29 and another aftertreatment module 99. A catalyst module or SCR module, although not shown, may be supported as well.

INDUSTRIAL APPLICABILITY

Figure 5:
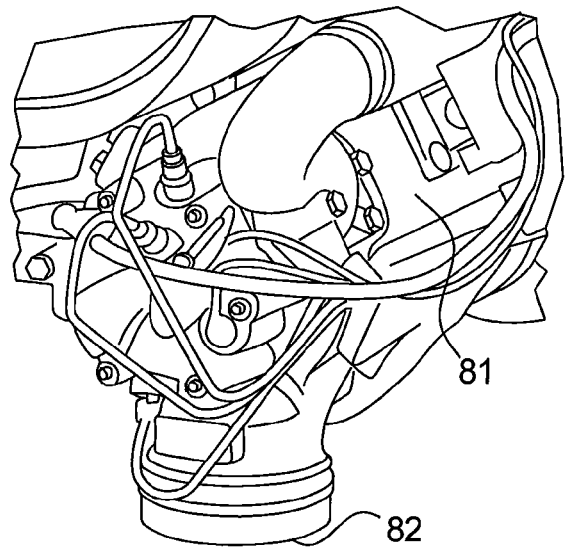
FIG. 5 is an enlarged view of the fuel injector head and exhaust inlet of the burner assembly illustrated in FIG. 4.
Figure 6:
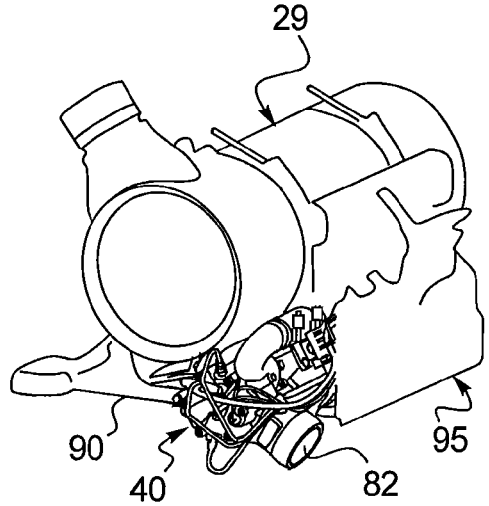
FIG. 6 is left front perspective view of the disclosed burner assembly of FIGS. 2-5, with the exhaust inlet rotated about 60° from the position illustrated in FIGS. 4-5.
Figure 7:
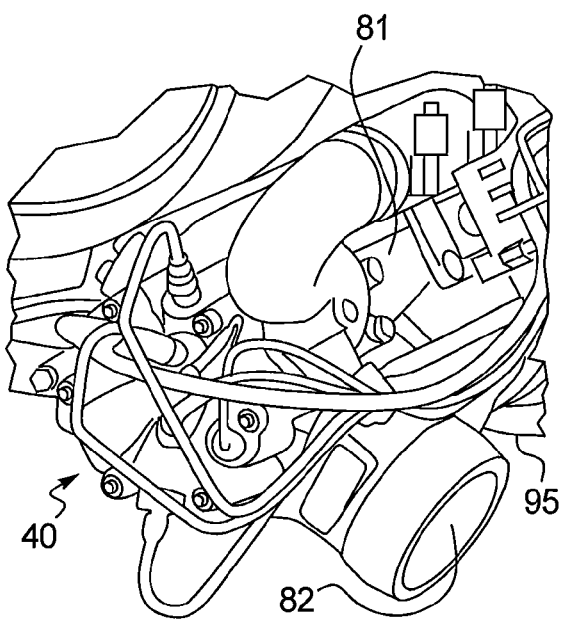
FIG. 7 is an enlarged view of the fuel injector head and exhaust inlet of the burner assembly as illustrated in FIG. 6.
Figure 8:
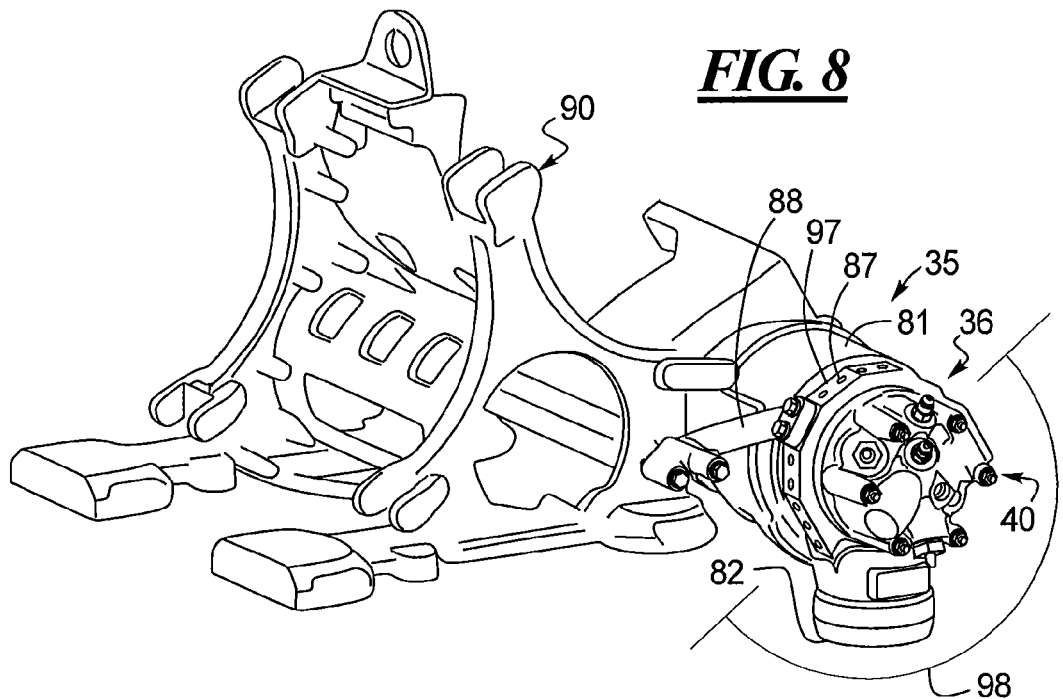
FIG. 8 illustrates the connection of a disclosed burner assembly to a cradle used for securing one or more additional components and the ability to rotate the burner and cradle about 180° while maintaining the position of the fuel injector head and related components.

As noted above existing burner assemblies for exhaust systems are not configured for versatility; most burners are not useable with different engines and/or different exhaust systems of different sizes, shapes and configurations. As shown in FIG. 8, with the seven pads 97 spaced along an arc of about 180° around the burner body 81, the exhaust inlet 82 may be placed at many different angular positions, only three of which are shown in FIGS. 5, 7 and 8. However, as shown in FIGS. 2-3, the fuel injector head 40 may be easily removed from the burner body 81, and holding the head 40 and associated components 95 in place, the burner body 81 may be rotated to place the inlet 82 in the correct or desired position. Further, the cradle 90 and bracket 88 may be adjusted independently from the burner body 81 and exhaust inlet 82. As a result, the disclosed burner/fuel injector assembly 35 overcomes one or more of the flexibility, versatility and size constraints of existing designs. While the examples of this disclosure are directed primarily to diesel engines and DPFs, one skilled in the art will appreciate that this disclosure is clearly applicable to other fossil fuel burning engines that employ filters that both trap particulates and that are robust enough for heat-based regeneration. Further, one skilled in the art will also appreciate that the disclosed burner assemblies are also applicable to other emission-control devices that can be activated with heat, such as certain catalyst systems.

As illustrated in FIG. 2, the threaded openings 76 disposed in the receiving mount 85 of the burner body 81 enable the fuel injector head 40 to be mounted to the burner body 81 of the burner 36 and a variety of different angular positions. Further, the burner body 81 includes an additional circumferential mounts in form of the spaced-apart pads 97. The pads 97 include one or more threaded openings 87 for mounting the proximal end 91 of the bracket 88 to the burner body 81 at a variety of different angular positions with respect to an axis 94 of the burner 36. In other words, the bracket 88, by way of its fasteners 89 can be mounted to the burner body 81 of the burner 36 at varying angular positions as shown in FIG. 8 and the fuel injector head may be mounted to the burner body 81 in a variety of angular positions as shown in FIG. 2. This flexibility allows the exhaust gas inlet 82 to be moved generally along the arc 98 shown in FIG. 8. As a result, the burner 36 and cradle 90 combination may be retrofitted onto exhaust systems of various manufacturers and various types of equipment.

The invention claimed is:

1. An exhaust treatment system comprising:
a body including an inlet for receiving a flow of exhaust, an outlet for exhaust flow to exit, an opening and a receiving mount disposed around the opening;
an injector head including a head mount;
the receiving mount engaging the head mount of the injector head to mount the fuel injector head over the opening in one of a plurality of positions relative to the body; and
the body including an outer surface having a plurality of pads separate from the receiving mount, each of the pads having one or more openings adapted to accept a fastener, the pads being positioned at least partially circumferentially around the body for coupling a support bracket separate from the injector head and head mount to the body in one of a plurality of positions relative to the body.

2. An exhaust treatment system of claim 1, wherein each of the one or more openings is threaded.

3. An exhaust treatment system of claim 1 wherein the body and injector head form a burner disposed upstream of a particulate filter that is configured to be regenerated by heat produced by the burner.

4. An exhaust treatment system of claim 3 wherein the particulate filter is a diesel particulate filter (DPF).

5. An exhaust treatment system of claim 3 further including at least one additional after-treatment device that is configured to be regenerated by heat from the burner.

6. An exhaust treatment system of claim 1 wherein the support bracket couples the body to a cradle that supports one or more after-treatment devices.

7. An exhaust treatment system of claim 6 wherein the one or more after-treatment devices includes a muffler module.

8. An exhaust treatment system of claim 6 wherein the cradle supports two additional after-treatment devices, one of which is a muffler module, the other of which is a DPF.

9. An exhaust treatment system of claim 1, wherein the injector head is adapted to receive air from an intake manifold.

10. An exhaust treatment system of claim 1 wherein the body and injector head form a burner assembly, the burner assembly being in communication with a diesel particulate filter (DPF) that is configured to be regenerated by heat from the burner assembly.

11. An exhaust after-treatment device of claim 1 wherein the support bracket couples the body to a cradle, which supports a DPF and a muffler module.

12. A method of modifying an exhaust treatment system of a machine having an engine, comprising:
orienting a fuel injector head relative to a burner body in one of a plurality of positions and coupling the fuel injector head to an opening in the burner body, the burner body including an exhaust gas inlet and an exhaust gas outlet, the burner body further including a plurality of pads extending at least partially around an outer surface the burner body;
securing a first end of a support bracket to one of the plurality of pads on the burner body;
coupling the exhaust gas inlet to an exhaust conduit in communication with the engine;
coupling the exhaust gas outlet to an after-treatment device of the exhaust treatment system that is configured to be regenerated by heat created in the burner body; and
coupling a second end of the support bracket to the machine.

13. A method of claim 12 wherein the after-treatment device is a particulate filter.

14. A method of claim 13 wherein the after-treatment device is a particulate filter in combination with a muffler module.

15. A method of claim 1, further comprising coupling the injector head to an intake manifold via an air conduit.

16. A machine comprising:
an engine connected to an exhaust treatment system, the exhaust treatment system including
a burner including a burner body including an inlet for receiving a flow of exhaust, an outlet connected to a particulate filter, an opening and a receiving mount disposed around the opening, the burner further including a fuel injector head including a head mount coupled to the receiving mount over the opening in one of a plurality of positions relative to the burner body;
the burner body including a plurality of mounting pads displaced from the receiving mount extending at least partially and circumferentially around the burner body for coupling a support bracket to the burner body in one of a plurality of positions relative to the burner body; and
the support bracket being coupled to the machine.

17. A machine of claim 16 wherein the body is coupled to a mounting arm extending circumferentially around at least part of the body, the mounting pads being disposed on the mounting arm.

18. A machine of claim 16 the support bracket couples the burner body to a cradle that supports one or more after-treatment devices.

19. A machine of claim 18 wherein the cradle supports two additional after-treatment devices, one of which is a muffler module, the other of which is a DPF.

* * * * *